United States Patent [19]

Vermeer

[11] Patent Number: 5,655,335
[45] Date of Patent: Aug. 12, 1997

[54] GREENHOUSE STRUCTURES AND ROOF STRUCTURES THEREFOR

[76] Inventor: Arthur Anthony Vermeer, 4723 Lincoln Ave. N., Beamsville Ontario, Canada, L0R 1B3

[21] Appl. No.: 499,456

[22] Filed: Jul. 7, 1995

[51] Int. Cl.[6] ................... E04B 7/16; E04B 7/12
[52] U.S. Cl. ................ 52/66; 47/17; 52/13; 52/18; 52/69
[58] Field of Search .................... 52/13, 14, 18, 52/1, 66, 69, 200; 47/17 R, 17 EC, 17 RM, 17 RL, 17 SC, 17 FM

[56] References Cited

U.S. PATENT DOCUMENTS

| | | | |
|---|---|---|---|
| 104,142 | 6/1870 | Hall | 52/13 |
| 673,497 | 5/1901 | Dietsch | 52/13 |
| 792,902 | 6/1905 | Kelly | 52/18 |
| 1,689,131 | 10/1928 | Goodwin | 52/18 |
| 2,896,558 | 7/1959 | Colburn, Jr. | 52/69 |
| 3,182,581 | 5/1965 | Poederoyen et al. | 52/1 |

*Primary Examiner*—Michael Safavi
*Attorney, Agent, or Firm*—McConnell and Fox

[57] ABSTRACT

A greenhouse roof structure for the usual rectangular in plan greenhouse comprises at least two rectangular roof panels each having a lower edge hinged to the structure for movement about a respective horizontal hinge axis. The roof panels are movable about their hinge axes between a fully closed position in which their upper edges meet to form a roof peak, and a fully open position in which they extend generally vertically at least approximately parallel to one another for the greenhouse space to be upwardly fully open to the ambient atmosphere, as is needed for example to "harden" new plants before they are exposed to the harsher ambient conditions outside the greenhouse. Preferably trusses extend transversely between the two outer side walls, support members are carried by the trusses, and transversely extending upwardly convex arch members are each connected at its ends to respective support members to connect them against the forces, such as wind forces, applied by the roof panels. A ridge post member for each arch member extends vertically from its transverse center point and a ridge member is mounted on the ridge post members. Preferably the roof panels are pivotally mounted on the arch members closely adjacent to the support members.

7 Claims, 5 Drawing Sheets

GREENHOUSE STRUCTURES AND ROOF STRUCTURES THEREFOR

FIELD OF THE INVENTION

This invention provides new greenhouse structures and particularly new greenhouse roof structures for use in the provision of a greenhouse ventilation system allowing full exposure of the greenhouse interior to ambient weather conditions. The invention also provides a new roof span structure for use in such greenhouse roof structures.

REVIEW OF THE PRIOR ART

The growth of various agricultural and horticultural crops in greenhouses are major industries, and the manufacture of greenhouses to meet their needs is another major industry. An essential aspect of greenhouse operation is the ability to control very closely the ambient conditions inside the greenhouse enclosure, this requiring careful control of the amount of outside air that is admitted, and to this end a number of different ventilation systems have been employed. For example, in one well-established system used with a greenhouse of conventional elongated rectangular plan with a peaked roof, the rectangular side walls, the rectangular roof portions, and the rectangular lower portions of the end walls are fixed, while the triangular peaked portions of the end walls can be opened to admit outside air to the interior when required; the end walls are also provided with fans which force air through the interior as required. In another well-established system, also with a conventional peaked roof, rectangular panels constituting portions of the roof adjacent to the roof peak are hinged at the peak for movement about horizontal axes and are moved upward by an internal mechanism when outside air is to be admitted.

A large portion of the plant growing industry using greenhouses involves the initial propagation of plants from seeds, cuttings, etc., the plants subsequently being removed to the location where they are grown to maturity. With many plants sudden transition from the protected greenhouse interior environment to the much harsher conditions encountered in the open would be inimical to good growth, and could even result in death of the plants. It is usual therefore during the last few days or weeks that the plants are in the greenhouse to progressively increase their exposure to the outside conditions of air, wind, rain and sun. This is very difficult with the greenhouse structures and ventilation systems employed to date since, for example, it is impossible to expose the plants to direct rain and sunlight because of the intervention of the roof glazing.

SUMMARY OF THE INVENTION

It is a principal object of the invention therefore to provide new greenhouse structures, and it is a particular object to provide new greenhouse roof structures.

It is a more specific object to provide new greenhouse roof structures that will allow full exposure of the interior of the greenhouse, and of the plants growing therein, to ambient weather conditions, particularly direct sun and rain.

It is a further object to provide a new roof span structure for use in such greenhouse roof structures.

In accordance with the invention there is provided a greenhouse structure comprising:

two parallel vertically extending outer side walls;

two parallel vertically extending outer end walls connected to the side walls and cooperating therewith to enclose a greenhouse space that is rectangular in plan;

at least one pair of rectangular roof panels, each panel having a lower edge connected by a respective hinge to the structure for movement about a respective horizontal hinge axis parallel to the side walls; and means connected between the roof panels and the structure for moving the panels about their hinge axes between fully closed positions in which the upper edges of each pair are immediately adjacent to one another and are supported by a horizontally extending longitudinal ridge member, forming an upwardly peaked roof above the greenhouse space obstructing opening of the space to the ambient atmosphere, and fully open positions in which they extend generally vertically at least approximately parallel to one another for the greenhouse space to be upwardly fully open to the ambient atmosphere.

Such a greenhouse structure comprises a roof span structure including:

a plurality of longitudinally spaced trusses extending transversely between the two outer side walls;

support members extending above the trusses and connected thereto;

a plurality of transversely extending upwardly convex arch members, each arch member being connected at its ends to respective immediately adjacent support members;

a vertically extending ridge post member for each arch member extending vertically from its transverse center point; and the horizontal longitudinally extending ridge member extending between the ridge post members.

DESCRIPTION OF THE DRAWINGS

Greenhouse structures, greenhouse roof structures and greenhouse roof span structures that are particular preferred embodiments of the invention will now be described, by way of example, with reference to the accompanying diagrammatic drawings, wherein.

DESCRIPTION OF THE PREFERRED EMBODIMENTS

Figure 1:
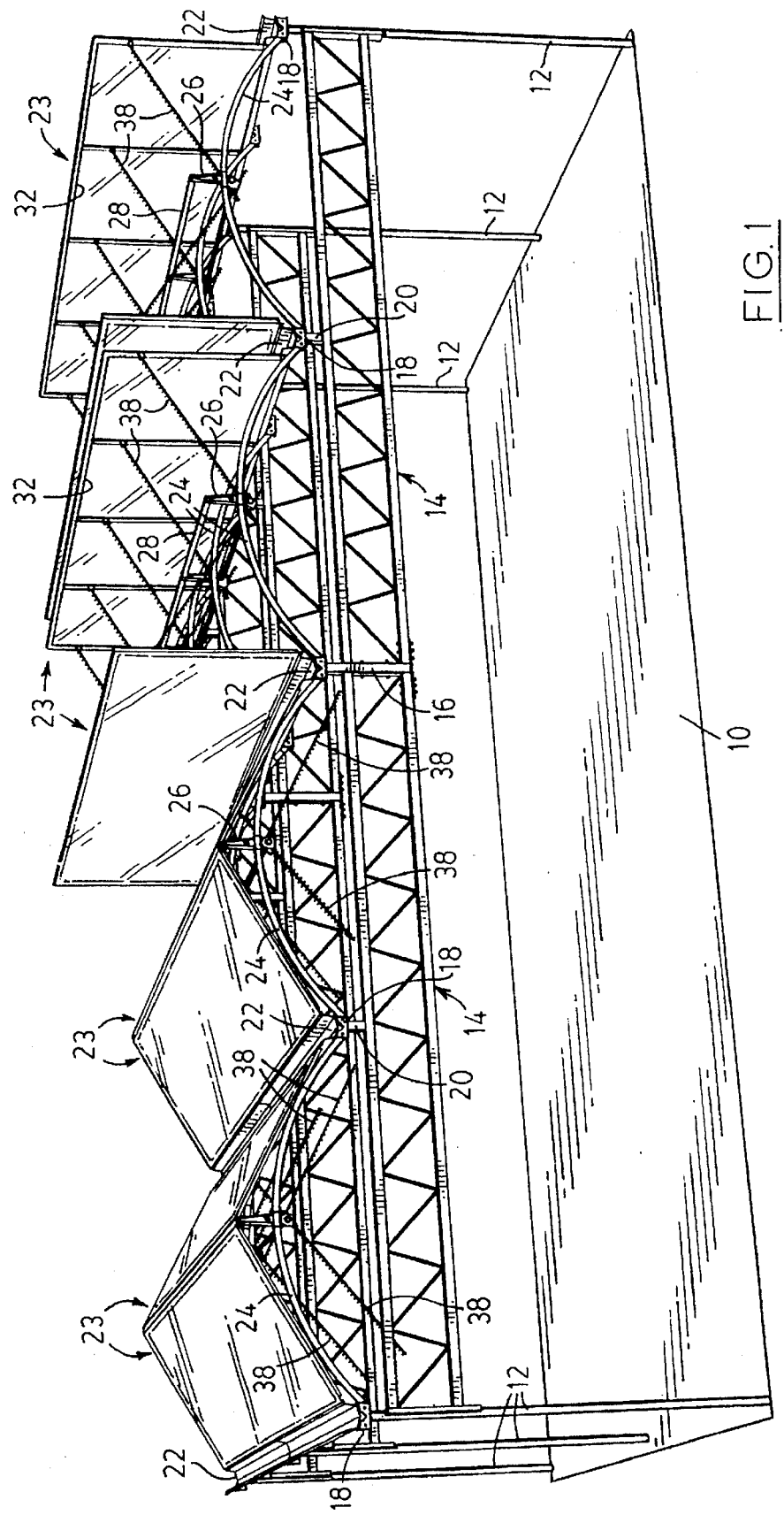
FIG. 1 is a perspective view of a portion of a greenhouse structure, looking in the longitudinal direction along the structure, showing two sections of the roof with their roof panels in closed position and two other sections of the roof with their roof panels in fully open position, drive means for moving the roof panels not being shown for clarity of illustration.
Figure 2:
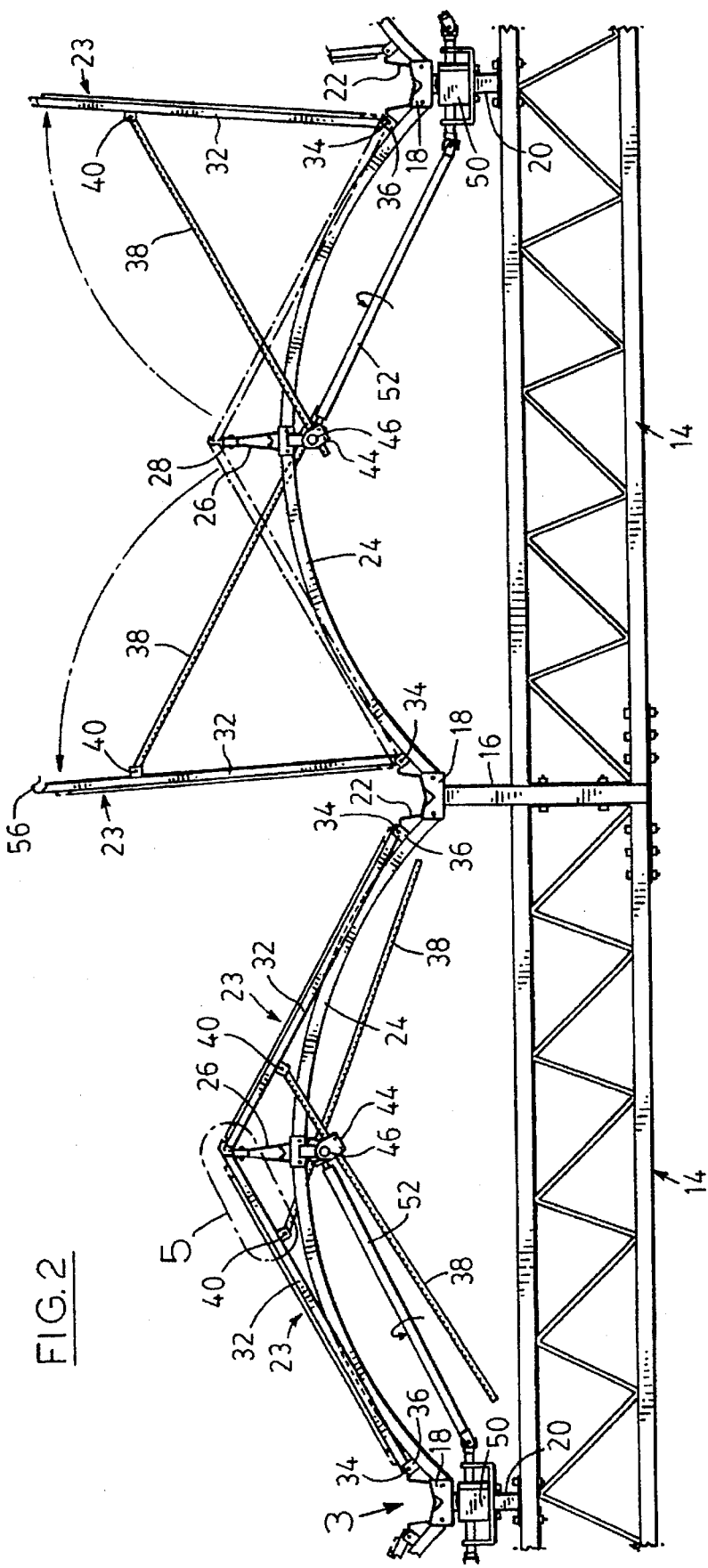
FIG. 2 is an end elevation of the central part of the greenhouse structure portion of FIG. 1, showing a single open section and a single closed section, and to an enlarged scale.
Figure 5:
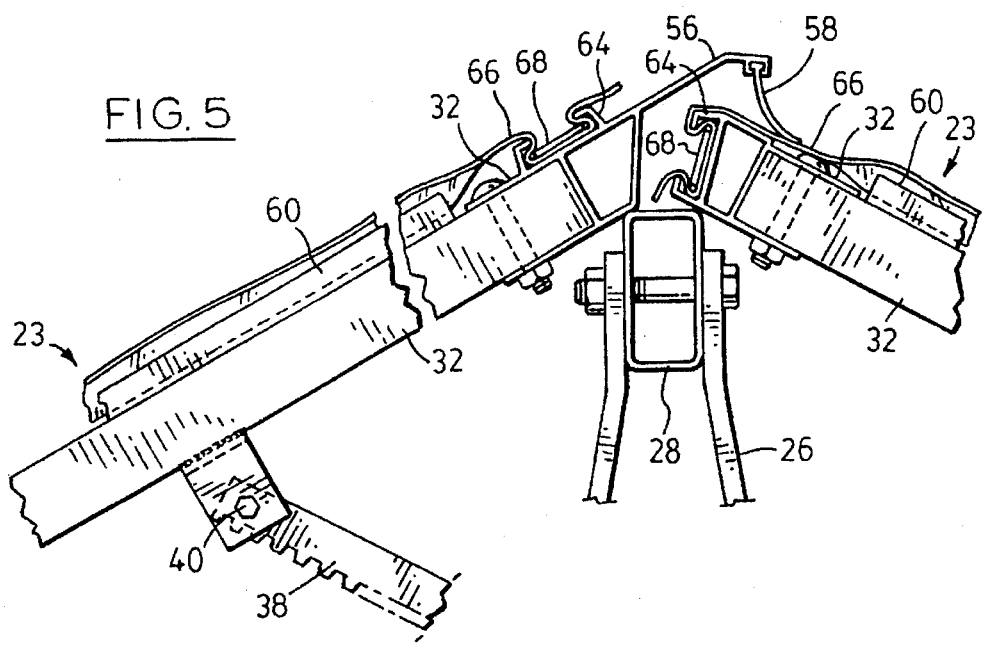
FIG. 5 shows the portion of FIG. 2 enclosed in the broken line and referenced 5 drawn to a larger scale.

It is an inherent feature of the greenhouse structures of the invention that, as is illustrated by FIGS. 1 and 2, the roof is upwardly peaked (in this embodiment it is multi-peaked with a plurality of parallel peaks) with each peak formed at the junction of two transparent or translucent roof panels that are hinged at their lower edges for pivotal movement about respective horizontal axes close to the respective gutters. The hinge mounting of the panels is such that they are movable between a fully closed position, (see the two left-hand peaks in FIGS. 1 and 2), in which their upper edges are closely adjacent to form the peak, (see particularly FIG. 5), and a fully open position, (see the two right-hand peaks in FIGS. 1 and 2), in which they have been moved through angles such that they are now slightly more than ninety degrees to the horizontal, so that each pair of immediately adjacent panels are inclined slightly backwards towards one another. In this fully open position the interior of the greenhouse enclosure is fully exposed to the air, to any incident sunlight, and to any rain that falls while the panels are open. The acclimatization of the plants in the enclosure interior can of course be accomplished gradually by progressive opening of the panels over a period of time, but is more usually carried out by opening them fully, with control of the times at which they are opened, so that for example they will initially only be exposed to light rains and to weaker early morning or late evening sun, and will not be exposed immediately to the full effect of heavy rains or midday sun.

FIG. 1 shows in perspective view a transverse section of a greenhouse structure mounted above a flat concrete floor pad 10, this specific structure comprising two parallel rows of cooperating pairs of longitudinally spaced vertical structure posts 12, with the two side-by-side posts of each pair connected by a transverse truss structure consisting of two truss members 14 disposed end-to-end. The posts support the greenhouse roof structure, as will be described below, and also support the usual glazed vertical outer side walls and end walls that cooperate to provide the rectangular plan shaped enclosure almost universally characteristic of commercial greenhouses. The specific construction employed for the outer side walls and the end walls is not pertinent to the invention, and further description thereof is not required. The enclosure can be made of any length by increasing the number of structure posts 12 in each row, and of any width by using as many parallel rows of side-by-side posts as are required, the specific values being dictated usually principally by considerations of cost, space available and overall arrangement of the greenhouse operation. The length chosen for the transverse span of the truss members 14 between each pair of side-by-side posts is usually dictated by consideration of the rapidly increasing truss depth and size of the truss members required as the span increases, and the economic availability of commercial standard size trusses.

Each of the truss members 14 is fastened at one end to a respective structure post 12, while their adjacent ends are connected by an intervening truss-connecting member 16 that extends vertically above the trusses to provide a mounting support for a gutter and roof arch supporting member 18. The posts 12 also extend above the truss members and each supports at its upper end a respective supporting member 18. Each truss member is provided centrally transversely of its width with a respective vertically upward extending stub post 20, each of which also carries at its upper end a respective support member 18. Each of the five parallel rows of support members 18 carries on its upper face a respective longitudinally extending gutter trough 22 discharging at the ends of the structure; these troughs are sufficiently strong to serve as walkways for maintenance personnel. Each roof peak is formed by a succession of pairs of flat transparent or translucent roof panels 23 disposed side edge to side edge and hinged at their lower edges to the greenhouse roof structure; the upper edges of each pair of cooperating panels meet at an obtuse angle when in the fully closed position and forming the respective peak.

Figure 7:
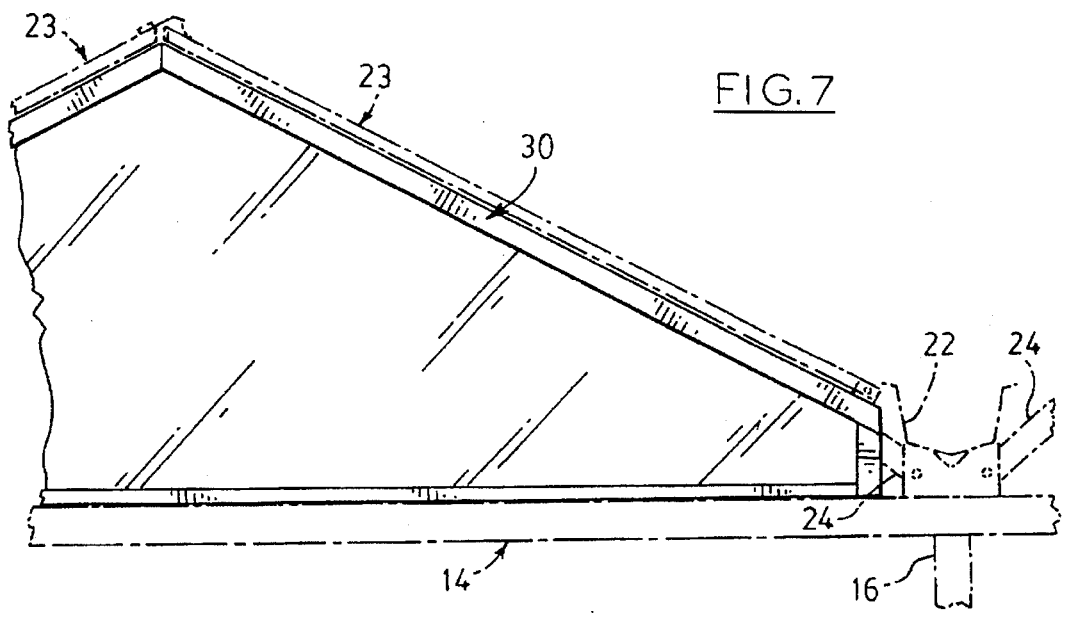
FIG. 7 is an end elevation of a glazed gable end panel closing the roof peak portion.

In prior art greenhouse structures the roof panels, or at least parts thereof, are fixed and connected rigidly into the roof structure, providing corresponding strength and rigidity thereto, and the provision of fully opening roof panels to leave an unobstructed opening beneath is difficult to achieve with conventional roof designs without the employment of roof members that are much thicker and more massive than those used hitherto, resulting in a greenhouse structure that is relatively heavy and expensive to manufacture. In the preferred structures of the invention the need for such heavy roof members is avoided by connecting each immediately adjacent pair of supporting members 18, at least at locations above their respective trusses 14, by upwardly convex smoothly curved arch connecting members 24. Preferably the arch members are curved about a horizontal axis and their curvature is such that the roof panels in fully closed position are approximately tangential thereto at a position along the length of the arch members nearer to the supporting members 18; in this embodiment the position is about a third of the distance along the arch members. In practice the roof member frames are offset so that they can dip slightly lower than the upper arch member surface, as is most clearly seen in FIG. 2. Their points of maximum height are therefore substantially below the respective peak, and each arch member 24 is provided at its transverse central point with a short vertically extending ridge supporting post member 26. The plurality of longitudinally aligned ridge supporting post members for each roof peak are connected together by a longitudinally extending ridge member 28 against which the roof panels rest in the fully closed position. The ridge member terminates at the ends of the structure at a triangular gable closure member 30 (see FIG. 7). In this embodiment each post member 26 comprises a saddle portion 70 that sits over the central part of the respective arch member. The saddle carries a downward extending member 72 that supports part of the drive means for the panels, as will be described below, and two upwardly extending inwardly inclined strut members 74 that are bolted to the ridge member 28. Because of the inherent strength and rigidity of such curved arch members 24, and the short length of the post members 26, a roof structure of the necessary strength and rigidity can be made acceptably light and capable of manufacture economically, despite the lack of contribution by the roof panels, and the relatively large forces, particularly wind forces, to which those panels may be subjected when in any open position, and especially when in a fully open position.

Figure 6:
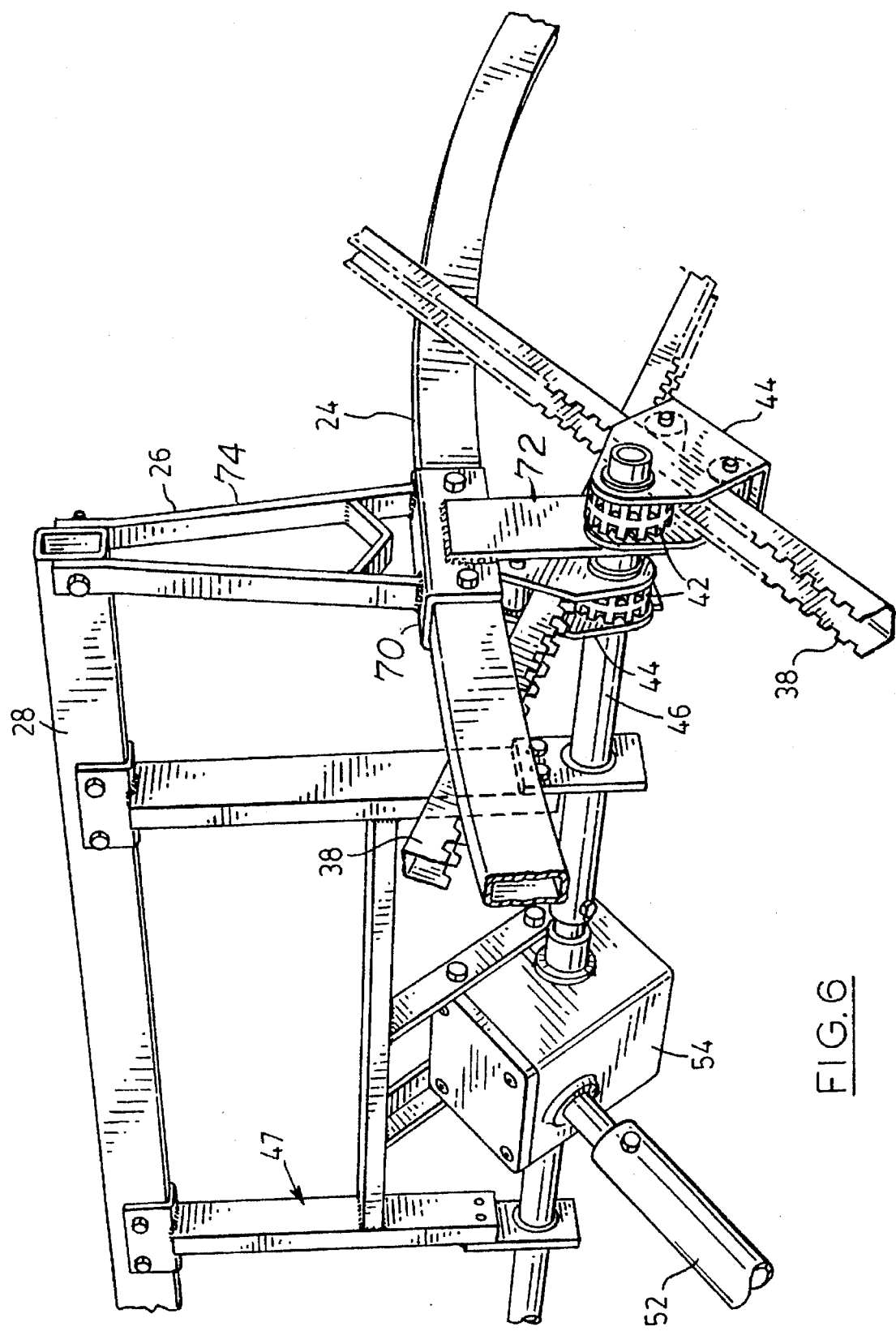
FIG. 6 is a perspective view of drive means for opening and closing the roof panels drawn to an enlarged scale.

Each roof panel 23 consists of a rectangular metal frame member 32 supporting glass or plastic glazing, in accordance with the requirements of the customer. Each panel is pivoted at its lower edge about a horizontal axis 34 to pivot members 36 (see FIG. 2) attached to the arch connecting members 24, and is moved between the fully open and fully closed positions by means of a respective U-cross section rack member 38 pivotally attached at 40 (FIGS. 2 and 5) to the panel frame member 32. As will be seen from FIG. 1 a rack member is usually provided at the edges of each individual roof panel, and at the junctions between each pair of butting panels, in order to provide the desired rigidity of support for the panels at all locations between their fully open and fully closed positions. Each rack member is engaged with a drive pinion 42 mounted for rotation about a horizontal axis in a housing 44, both the pinion and the housing being supported by the downward extending member 72 of the ridge support member 26 attached to the respective arch supporting member 18 immediately beneath the respective ridge post member 26. A number of these pinions and housings that are axially aligned support a common longitudinally extending drive shaft 46, which is also supported from the ridge member 28 by a support structure 47 (FIG. 6). The two such shafts operative with the roof panels of two immediately adjacent peaks are rotated as required by a common drive motor 48 (FIGS. 3 and 4), mounted on a longitudinally extending horizontal support 49 extending between two adjacent stub posts 20, the connection to the two associated drive shafts 46 being via a reduction gear 50, universally-jointed drive shafts 52 and final right angle drives 54 supported by the structure 47. The motor 48 can be operated manually by a suitable control (not shown), but in commercial practice will also usually be capable of automatic operation by a sensor controller that determines factors such as the ambient temperature, the time of day, and the wind speed and operates accordingly to open and close the roof panels. In particular, because of the relatively high windage presented by the roof panels when in or close to their fully open positions, the controller will operate to close the panels if the wind reaches a predetermined minimum speed. The design and structure of such controllers is not pertinent to this invention and further description is not required.

Figure 3:
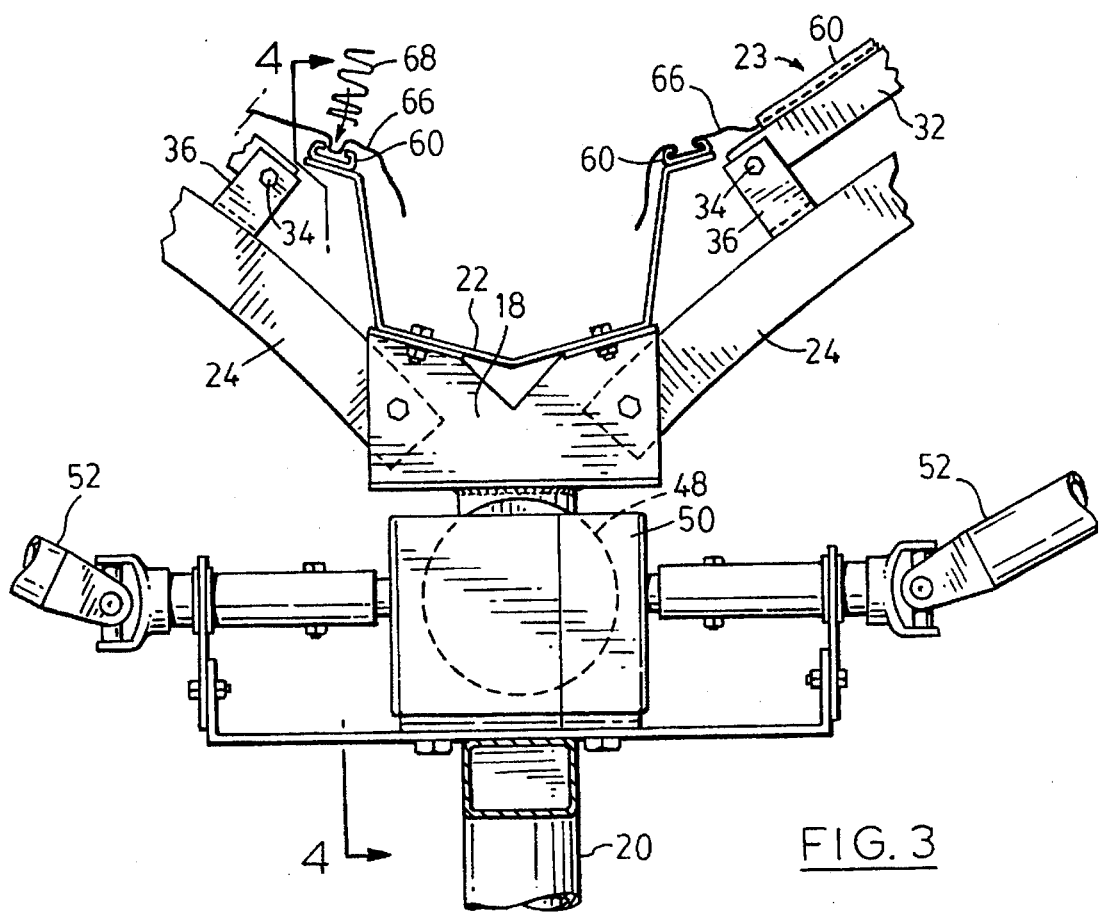
FIG. 3 is an end elevation of the portion of FIG. 2 indicated by the arrowed reference 3 and to a still larger scale.
Figure 4:
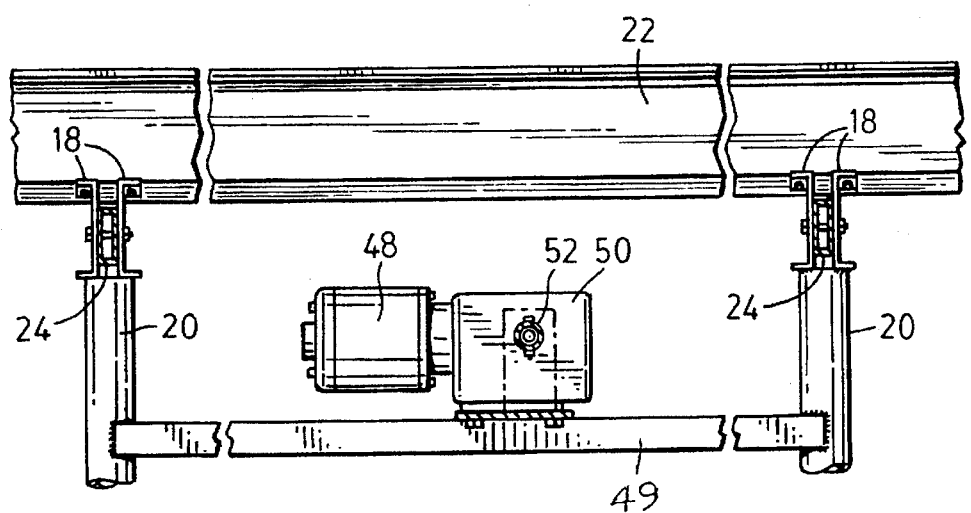
FIG. 4 is a cross-section taken on the line 4—4 in FIG. 3.

An economical and lightweight glazing structure for the roof panels consists of two spaced sheets 66 of thin flexible plastics material; in some structures the space between the sheets is pressurized to hold them apart and increase the insulation value. The sheets are retained in seal channels 64 extending along the edges of the panels. The channels have re-entrant lips providing a narrower mouth opening, the edges of the sheets being retained therein by means of sinusoidal shaped longitudinally extending spring members 68 that are engaged in the channels. The junctions between the roof panels and the supporting roof structure must be sealed against drafts and entry of rain water when the panels are closed, and to this end, as shown in FIG. 3, the upper edges of the gutters 22 are provided with seal channel members 60 in which the lower edges of the upper glazing sheet 66 are retained by spring retainers 68, the free ends of the sheets extending downward into the gutters. The seal provision for the panel upper edges is shown in detail in FIG. 5; the upper edge of one of each pair of cooperating roof panels forming a peak is provided with an extension 56 extending generally in the plane of the panel and carrying a flexible seal member 58. If the roof panel carrying the extension and seal member arrives at the ridge member 28 somewhat after the other roof panel then the seal member is laid down onto the top surface of the other roof panel, as is required, while if it arrives somewhat before the other roof panel the extension and seal member are long enough to permit the other roof panel to brush past the seal member until again it engages the top surface of the other roof panel to provide an effective seal. The butting roof panel side edges are provided with butting seal members of suitable resilient material.

It will be seen that the invention provides a relatively simple but effective greenhouse roof structure that, as indicated above, because of its arrangement can be of suitably lightweight components, and yet will provide a structure of adequate strength and rigidity, while being suitably economical for commercial manufacture.

I claim:

1. A greenhouse structure comprising:

two parallel vertically extending outer side walls and two parallel vertically extending outer end walls connected to the side walls and cooperating therewith to enclose a greenhouse space that is rectangular in plan; and a roof span structure including;

a plurality of longitudinally spaced trusses extending transversely between the two outer side walls;

support members extending above the trusses and connected thereto;

a plurality of transversely extending upwardly convex arch members, each arch member being connected at its ends to respective immediately adjacent support members;

a vertically extending ridge post member for each arch member extending vertically from its transverse center point; and a horizontal longitudinally extending ridge member extending between the ridge post members;

the greenhouse structure also comprising:

at least one pair of rectangular roof panels, each panel having a lower edge connected by a hinge to the structure for movement about a respective horizontal hinge axis parallel to the side walls; and means connected between the roof panels and the structure for moving the panels about their respective hinge axes between a fully closed position in which the upper edges of each pair are immediately adjacent to one another and are supported by the ridge member so as to form an upwardly peaked roof above the greenhouse space closing the space to the ambient atmosphere, and a fully open position in which the panels extend generally vertically at least approximately parallel to one another for the greenhouse space to be upwardly fully open to the ambient atmosphere.

2. A greenhouse structure as claimed in claim 1, wherein the arch members are curved about a horizontal axis and the curvature thereof is such that the roof panels in fully closed position are approximately tangential thereto at positions along their length closer to the support members.

3. A greenhouse structure as claimed in claim 1, wherein the roof panels are pivotally mounted on the arch members closely adjacent to the support members.

4. A greenhouse structure as claimed in claim 1, wherein each ridge post member also extends below its arch member and supports part of the means for moving the roof panels.

5. A greenhouse structure as claimed in claim 1, wherein the upper edge of one of each pair of cooperating panels is provided with an extension in the plane of the panel, and the outer edge of the extension carries a downward extending resilient seal that engages the upper surface of the other panel of the pair when in the fully closed position to seal the joint between the panels at the respective peak.

6. A greenhouse structure as claimed in claim 1, and comprising a plurality of pairs of rectangular roof panels that are disposed longitudinally of one another between the outer end walls and that in the fully closed position are supported by a common ridge member.

7. A greenhouse structure as claimed in claim 1, and comprising a plurality of pairs of rectangular roof panels that are disposed side by side between the outer side walls and that in the fully closed position are supported by a respective one of a corresponding plurality of ridge members, the ridge members extending parallel to one another.

* * * * *